United States Patent

Broisman

[15] 3,644,256

[45] Feb. 22, 1972

[54] RESORCINOL-FORMALDEHYDE-LATEX ADHESIVE CONTAINING TRIALLYL CYANURATE WITH HIGH-RINGBOUND CHLORINE CONTENT

[72] Inventor: Raymond Broisman, Linden, N.J.

[73] Assignee: American Cyanamid Company, Stamford, Conn.

[22] Filed: Aug. 8, 1969

[21] Appl. No.: 848,690

[52] U.S. Cl..............................260/29.3, 156/110, 156/331, 156/335, 161/198, 161/227, 161/231, 161/241, 260/51.5, 260/54, 260/845, 260/848
[51] Int. Cl..........................................................C08g 5/10
[58] Field of Search.................260/29.3, 51.5, 54, 845, 846, 260/848; 161/227, 198, 231, 241, 257; 156/110, 331, 335

[56] References Cited

UNITED STATES PATENTS

| | | | |
|---|---|---|---|
| 3,304,222 | 2/1967 | Wilken | 260/29.3 |
| 3,318,750 | 5/1967 | Aitken | 161/227 |
| 3,424,608 | 1/1969 | Marzocchi et al. | 260/29.3 |
| 3,476,642 | 11/1969 | Berg et al. | 260/29.3 |
| 3,476,701 | 11/1969 | Aldred et al. | 260/29.3 |
| 3,549,481 | 12/1970 | Cesare | 161/198 |

Primary Examiner—Donald J. Arnold
Attorney—James H. Laughlin, Jr.

[57] ABSTRACT

A composition comprising an aqeous dispersion of
(A) 50–95 parts of a resorcinol-formaldehyde-latex adhesive composition,
(B) 5–50 parts of an aqueous dispersion of 10–70% of the reaction product of
(1) a composition derived by reacting a triallyl cyanurate composition having 0.05% to 3.0% ring-bound chlorine, with 6–10 moles of resorcinol per mole of cyanurate; and
(2) 0.2 to 0.6 mole of formaldehyde per mole of resorcinol in (1)

These compositions are useful in bonding rubber to reinforcing fibers.

4 Claims, No Drawings

RESORCINOL-FORMALDEHYDE-LATEX ADHESIVE CONTAINING TRIALLYL CYANURATE WITH HIGH-RINGBOUND CHLORINE CONTENT

This invention relates to materials and methods for improving the adhesion of nonrubbery materials to rubber. The invention further relates to processes for preparing novel compositions used in the method of this invention.

It is known to incorporate shaped structures, such as films, cords and fibrous textile materials, and particularly, polyamide and polyester fibers, into rubber, in order to reinforce the rubber and improve the wearing qualities of the resultant rubber articles. This is particularly important in the case of tires, conveyor belts, transmission belts and, in general, articles which are subjected to severe loads. This method, however, has been far from satisfactory, because the fibrous material during usage, separates from the rubber. The separation usually is accompanied by generation of heat, tears and frequently complete breakdown of the article.

Many attempts have been made to improve the adhesion of the fibrous materials to rubber in order to obtain products of improved wearing quality and strength. The method of Canadian Pat No. 625,487 consists of reinforcing rubber with fibrous material of the polymethylene terephthalate type, using a two-coat adhesive system. The first coat consists of triallyl cyanurate which may also contain vinyl chloride. The second coat is a dispersion of a polymer of vinylpyridine and a resorcinol-formaldehyde-la-tex composition. The fibrous material is coated with triallyl cyanurate, and the latter polymerized by heating. Although this method has given some improvement in bonding properties between the fibrous material and the rubber, the prolonged heating necessary to polymerize triallylcyanurate is a serious disadvantage. Moreover, this method does not give sufficiently reproducible results.

More recently, U.S. Pat. No. 3,318,750 describes a method in which the fibrous material is coated with (1) an aqueous solution of the reaction product of an aldehyde and a composition derived from the reaction of triallyl cyanurate and an excess of a polyhydric phenol and (2) a resorcinol-formaldehyde-latex adhesive composition. The coated material is heated, embedded in vulcanizable rubber and the rubber vulcanized. The adhesive compositions of this patent have undoubtedly resulted in superior bonding of the reinforcing material to the rubber and thus in superior finished articles; however, under the action of heavy loads and the stresses to which many rubber articles, for instance tires, are subjected, these products do not exhibit sufficient strength.

The adhesives proposed in U.S. Pat. No. 3,307,966 contain a polyepoxide and a polyisocyanate and are objectionable because of the toxicity of the polyisocyanate and the problems involved in finding a suitable solvent for application of the adhesive.

An object of this invention is to provide novel compositions capable of improving the adhesion between fibrous materials and rubber. Another object is to provide compositions which are economical, suitable for commercial application, and which may be applied to a variety of fibers, and particularly synthetic fibers such as fiber glass, polyester fibers and the like.

Still other objects will be apparent from the ensuing description of this invention.

In accordance with one aspect of this invention, it has been found that the triallyl cyanunate-resorcinol-formaldehyde reaction product and a resorcinol-formaldehyde-latex adhesive composition give superior adhesion when the triallyl cyanurate contains a compound having chlorine attached to a triazine ring. The proportion of ringbound chlorine calculated as cyanuric chloride, should be between about 0.05 and 3.05 percent based on the weight of triallyl cyanurate. In view of the fact that the ringbound chlorine is reactive and that it may cause side reactions, including undesirable exothermic reactions, the general practice in the art has been to purify the product and to use either pure triallyl cyanurate or triallyl cyanurate with low-ringbound chlorine content, in the range of 0.01–0.02 Percent. Thus the finding that superior adhesion between the fibrous materials and the rubber is achieved with ringbound chlorine up to 3.08, is unexpected and surprising.

The compositions useful for improving the adhesion between rubber and fibrous materials, according to the present invention, comprise component A a resorcinol-formaldehyde-latex adhesive mixture (hereinafter sometimes referred to as the RFL dip) and component B the reaction product of triallyl cyanurate (sometimes referred to hereinafter as "TAC") which contains between 0.05 and 3.0 percent of ringbound chlorine, resorcinol and formaldehyde. The adhesive compositions to be applied to the fibrous materials comprise 50 to 95 parts of component A and 5 to 50 parts of component B.

The compositions of this invention are applied to the fibrous materials by any conventional method, such as for instance, dipping, spraying, brushing, or padding. Reaction of components A and B occurs upon drying, and heating at about 150°–250° C. for up to about 2 minutes. In this manner, the adhesive composition is cured and forms a coating upon the fibrous material which constitutes about 2–10 percent by weight of the total fiber weight. It is preferable to subject the fibrous materials to sufficient tension during the wetting and curing operations to prevent shrinkage. Following the formation of the coating on the fibrous material, rubber is applied by conventional techniques.

The compound within component B which contains ringbound chlorine, may be triazine of the formula (I):

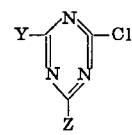

in which Y and Z are individually either chlorine, hydroxy or allyloxy groups. Cyanuric chloride, monochloro-dihydroxy-s-triazine, dichloro-monohydroxy-s-triazine monochloro-diallyloxy-s-triazine and dichloro-allyloxy-s--triazine are specific compounds within the scope of formula I which can be used to supply the RBC content of component B.

TAC is conveniently prepared by the method described in U.S. Pat. No. 2,537,816. The method consists of admixing allyl alcohol in substantial excess over the theoretical amount of 3 moles per mole of cyanuric chloride with cyanuric chloride in the presence of at least 3 moles of an alkali metal hydroxide. Alkali metal carbonates or calcium or barium hydroxide may also be used. By way of example, the reaction is carried out by dissolving at least 3 molar equivalents of sodium hydroxide, in a least 3 molar equivalents of allyl alcohol, at about 20°–30° C., stirring, and slowly adding one molar equivalent of cyanuric chloride. After the reaction is complete, sodium chloride is filtered off, and the filter cake washed with allyl alcohol. The desired triallyl cyanurate is then obtained from the combined filtrate and washings by distilling the allyl alcohol under vacuo. The crude product may be purified by repeatedly washing with sodium hydroxide and water.

Triallylcyanurate ordinarily contains no more than a trace of ringbound chlorine, e.g., about 0.01–0.02 percent of RBC, several methods may be used. This it is possible to use less than the required amount of base or of allyl alcohol, so that an insufficient amount of either reactant is present to complete the replacement of the three chlorine atoms of cyanuric chloride.

It is also possible to use a less concentrated sodium hydroxide solution. More specifically when pure TAC is desired, 50 percent sodium hydroxide, in a slight excess, about 2–3 percent, is dissolved in allyl alcohol in a substantial excess, about 50 percent, at 20°14 30° C. Then cyanuric chloride is added. The product is purified by repeated sodium hydroxide and water washing. If triallyl cyanurate of high-ringbound chlorine content, i.e., having between 0.05 and 3.0 percent is to be prepared, it is possible to use 25–50 percent aqueous sodium hydroxide in less than the stoichiometric amount during the reaction. It has also been found that if the amount of allyl alcohol used is less than 50 percent excess, the product contains ringbound chlorine A calculated amount of this substance may be added to TAC of low-RBC content, i.e., 0.01–0.02 percent ringbound chlorine, to give TAC of the desired ringbound chlorine content.

A rubbery copolymer latex suitable for use in preparing the RFL-adhesive composition is a vinyl pyridine copolymer latex sold under the trademark "GENTAC" by the General Tire and Rubber Company. This latex is an aqueous dispersion of a terpolymer derived from the copolymerization of 70 percent by weight of butadiene, 15 percent of vinylpyridine and 15 percent by weight of styrene. The dispersion normally contains about 40 percent of elastomer solids. Another suitable copolymer latex is "Pliolite 2108" which is the trademark of the Goodyear Tire and Rubber Company for the styrene-butadiene rubber latex derived from the copolymerization of 29 percent by weight of styrene and 71 percent by weight of butadiene. A mixture of Gentac and Pliolite 2108 is a preferred latex for the adhesive compositions of this invention. Other latices, such as natural and butyl rubber may also be employed. The selection of the rubbery latex is determined by the type of rubber stock employed and it is within the skill of the art to choose the latex which suits the rubber stock.

The adhesive properties of the compositions of this invention are determined by coating the shaped structures, fibrous materials and the like with the compositions of this invention, drying and heating to cure the compositions, then embedding the coated material in vulcanizable rubber and finally vulcanizing the rubber. The tension necessary to strip the fibrous material from the elastomer sheet is then determined.

Although the coating of the fibrous materials with the adhesive compositions of this invention may be obtained by separately applying components A and B in either order, in a liquid carrier which may be the same or different, it is preferable to combine the two components in a single liquid carrier, and apply the mixture to the fibrous material. According to a preferred embodiment of the invention, components A and B in water as a liquid carrier, are mixed and the fibrous materials are dipped into the mixture.

The rubber stock is either a natural material or a synthetic styrene-butadiene rubber. The rubber referred to in the tests is compounded by mixing the ingredients below on a two-roll rubber mill, sheeting off and protecting one surface with a polyethylene film Preformed strips of appropriate size are then cut from the sheet of rubber stock without removing the polyethylene film.

The natural rubber stock has the following composition:

| Component | Parts by Weight |
|---|---|
| No. 1 Ribbed Smoked Sheets | 100 |
| Stearic Acid | 2 |
| Easy Processing Channel Black | 10 |
| Fast Extruding Furnace Black | 20 |
| Zinc Oxide | 5 |
| Light Process Oil | 5 |
| Octylated Diphenylamine Antioxidant | 1 |
| Sulfur | 3 |
| MBTS | 1 |

The synthetic styrene-butadiene rubber has the following composition:

| Component | Parts by Weight |
|---|---|
| SBR | 80 |
| Reclaim (Non-staining Tire) | 40 |
| Stearic Acid | 2 |
| Fast Extruding Furnace Black | 40 |
| Zinc Oxide | 3 |
| Circosol 4240 (Naphthenic Oil) | 10 |
| Sulfur | 2.5 |
| N-Oxydiethylene benzothiazole-2-sulfenamide | 1.2 |
| Diphenyl Guanidine | 0.25 |

For the purpose of better illustrating the invention, the following examples are described hereinbelow. Parts and percentages are on a weight basis.

EXAMPLE 1

This example shows the preparation of TAC containing no more than a trace amount (i.e., 0.01 percent) of any compound having chlorine bonded to a triazine ring. The reaction involves a total of 4,000 pounds (68.9 moles) of real allyl alcohol with 2,800 pounds (15.2 moles) of cyanuric chloride, and 1,984 pounds of real sodium hydroxide as a 50 percent aqueous solution (46.6 moles of sodium hydroxide).

The allyl alcohol (51 percent excess) is pumped into a reactor and the 50 percent sodium hydroxide solution and cyanuric chloride are added concurrently. The temperature is maintained at 20°–25° C. The excess sodium hydroxide is neutralized with hydrochloric acid, the excess allyl alcohol is stripped off under vacuum and the sodium chloride is dissolved in water which is separated from the crude triallylcyanurate layer. The crude triallyl cyanurate is washed once with 5 percent sodium hydroxide and then three times with water to remove reaction impurities. The residual water is then stripped off under vacuum, a polymerization inhibitor is added and the TAC is filtered off and collected. The product has a ringbound chlorine content of 0.01 percent.

EXAMPLE 2

This example illustrates the preparation of TAC containing about 2.37 percent of ringbound chlorine. The reaction involves a total of 2,645 pounds (45.5 moles) of allyl alcohol with 2,800 pounds (15.2 moles) of cyanuric chloride and 1,865 pounds (46.6 moles) of caustic soda as a 50 percent aqueous solution.

The allyl alcohol (0% excess) is pumped into a reactor and the 50 sodium hydroxide solution and cyanuric chloride are added concurrently. The temperature of the reaction is maintained at 20° to 25° C. The excess NaOH is neutralized with hydrochloric acid and the salt is dissolved in water which is then separated from the crude TAC layer. The crude TAC is washed once with 5 percent sodium hydroxide and three times with water to remove reaction impurities. Residual water is then stripped under vacuum, a polymerization inhibitor is added and the TAC is collected. The product is a water-white oily liquid having a ring bound chlorine content of 2.37 percent.

EXAMPLE 3

The procedure of Example 2 was followed identically in a series of reactions in which the percent of allyl alcohol in excess of the theoretical amount was varied. The following table shows the relationship between the ringbound chlorine content of the product and the percent excess allyl alcohol used in the reaction:

TABLE

| Relationship of RBC Content to Percent Excess Allyl Alcohol | |
|---|---|
| Excess Allyl Alcohol (5) | Ring-bound Chlorine (%) |
| 0 | 2.30 |
| 10 | 2.28 |
| 15 | 2.33 |
| 15 | 2.27 |
| 20 | 1.40 |
| 25 | 1.39 |
| 30 | 0.49 |
| 30 | 0.52 |
| 35 | 0.30 |
| 25 | 0.26 |
| 40 | 0.16 |
| 45 | 0.07 |
| 50 | 0.01 |
| 50 | 0.01 |

EXAMPLE 4

This example illustrates the preparation of TAC with high-RBC content by reducing the amount of sodium hydroxide used in the beginning of the esterification reaction and then adjusting to the desired RBC content by addition of additional sodium hydroxide at the end of the reaction.

Following the procedure of Example 2, 68.9 moles of allyl alcohol, 15.2 moles of cyanuric chloride and 35 moles of sodium hydroxide were charged into a reactor in which the temperature was maintained at 20° to 25° C. After about 6 hours, a 50 percent caustic solution containing 11.6 moles of sodium hydroxide was added in increments.

EXAMPLE 5

This example illustrates the preparation of TAC containing about 0.8 percent RBC by conducting the esterification in dilute caustic.

The procedure of Example 4 is varied by adjusting the concentration of the caustic which is added to the reaction mixture at the commencement of the reaction. Thus, instead of adding 50 percent caustic, the reactor is charged with 25 caustic so that approximately 17.5 moles of sodium hydroxide is present. At the end of the reaction, the remainder of the sodium hydroxide is then added.

EXAMPLE 6

This example illustrates the preparation of TAC containing ringbound chlorine by the addition of at least one compound containing ringbound chlorine to TAC.

The product of Example 1 (100 grams) is charged into a vessel and 0.5 grams of diallyoxy-monochloro-s-triazine is added. The mixture is stirred, giving a TAC product with a ringbound chlorine content of 0.5 percent. Similarly, a TAC product with 2.0 percent of ring-bound chlorine is obtained by the addition of two grams of diallyloxy-monochloro-s-triazine to 100 grams of TAC produced as in Example 1 above.

EXAMPLE 7

A resorcinol-formaldehyde-latex adhesive composition (component A) was prepared from the following ingredients:

| | Parts by Weight |
|---|---|
| Gentac polyvinylpyridine latex of about 41% solids | 316.0 |
| Pliolite 2108 styrene-butadiene rubber latex of about 40.7% solids | 77.0 |
| Water | 512.8 |
| Resorcinol | 27.4 |
| Formalin (37% Formaldehyde) | 24.2 |
| 5% NaOH | 42.6 |
| | 1,000.0 |

The ingredients were combined as follows:

The Gentac and Pliolite latices were mixed with gentle stirring. Resorcinol was dissolved in water in a separate vessel, formaldehyde added, followed by the sodium hydroxide solution under stirring. The resulting material was immediately added to the latex mixture and the mixture stirred gently for about 10 minutes. The mixture was then allowed to stand in a closed glass container for about 70 hours at 70°±50° F.

Samples of component B were prepared using triallyl cyanurate containing 0.1, 1 and 2.2 percent ringbound chlorine and the following ingredients:

| Components | Parts by Weight |
|---|---|
| Resorcinol | 17.23 |
| TAC | 4.14 |
| Red Lead | 0.04 |
| Formaldehyde (33%) | 4.83 |
| Ammonium Hydroxide (28%) | 4.83 |
| Water | 68.93 |

The resorcinol is heated to 180° C. in a one-liter flask fitted with a mechanical agitator, thermometer and condenser. At 180° C., with agitation, the TAC is added and the temperature is allowed to rise to 225° C. The red lead is added and the mixture kept at 220°–225° C. for 3 hours. It is cooled to 130° C. and the formaldehyde is added slowly to maintain the reaction temperature at 130° C. The water and ammonium hydroxide are mixed and added to the mixture in the flask. The resultant mixture is agitated well, cooled to room temperature and filtered. The Table below summarizes the samples of TAC used.

RBC Content of TAC

| Solution No. | Amount of ring-bound |
|---|---|
| 1 | 0.01% |
| 2 | 1.0% |
| 3 | 2.2% |

A dip for tire cord was prepared as follows:

Samples of 50 parts by weight of Solution No. 1 or 2 or 3 above were added to 100 parts of the RFL mixture component A prepared as described hereinabove. The following Table shows the composition of each dip and of a control having no component B:

ADHESIVE DIP

| Ingredient | Composition A | Composition B | Composition C | Composition D |
|---|---|---|---|---|
| RFL Adhesive | 100 | 100 | 100 | 100 |
| Soln No. 1 | 50 | — | — | — |
| Soln. No. 2 | — | 50 | — | — |
| Soln. No. 3 | — | — | 50 | — |

Test samples of polyester tire cord were dipped in the adhesive mixtures, then dried by heating for 2 minutes at 100° C., and heat treated at 250° C. for 2 minutes while subjected to tension, to prevent shrinkage.

The strength of the adhesive bond of the treated cords to the carcass stocks was evaluated by a modification of the Single End Strip Adhesion test, described in U.S.P. at No. 3,307,966. The mold used had multiple cavities approximately 1×6×1/4 inch, and had metal strips on two opposite sides bearing slots so located that four lengths of cord could be positioned longitudinally over each cavity. The mold was preheated to the vulcanization temperature. A strip of cotton duck 1×6 inches was placed in the bottom of each cavity, then the preformed carcass stock, protected side up, was placed over the cord, and the protective polyethylene film was then stripped off. Four lengths of cord were placed over each strip of stock, with each cord in the same strip having received the same treatment. A small strip of Cellophane was inserted between the cords and the rubber stock at one end of the structure, so that a portion of each cord remained free from clamping during the test. The cords were under a deadweight tension of approximately 50 grams per cord, to maintain their position. The top plate was placed on the mold, and the latter was then pressed in a platen press. Vulcanization was then carried out, 40 minutes with the natural rubber and 45 minutes with the styrene-butadiene stock, both at 138° C. The samples were then removed from the press. It was noted that the cords were firmly embedded in the cured elastomer stock. The cord ends were separated from one end of the strip and the free end of the strip was clamped in the upper jaw of an Instron testing machine, while the freed end of one cord was clamped in the lower jaw. The tension necessary to strip the single cords individually from the elastomer strip at a jaw separation speed of 2 inches per minute was then determined. The results, reported as the tension necessary to strip the cord with the highest value, are given below:

Adhesion to Carcass Stock

| Cord Treatment with Compositions A–D | Force to Strip Single End (grams) | |
|---|---|---|
| | S B R | Natural Rubber |
| A | 935 | 810 |
| B | 1610 | 1360 |

| | | |
|---|---|---|
| C | 1520 | 1060 |
| D | 512 | 553 |

The results conclusively show that the adhesion is greater in A than D, that is, using the adhesive composition comprising triallyl cyanurate with only a trace amount of ringbound chlorine, as compared with the RFL dip alone. When the ringbound chlorine content is high, as in B and C, the adhesion is substantially greater, both with natural as well as styrene-butadiene rubber.

Although polyester fibers are used in the example described in detail hereinabove, the invention is equally applicable to other fibrous materials useful for the reinforcement of rubber products, such as cotton, nylon, rayon and the like. The invention is particularly useful in the field of automobile tires, where polyester cord is often used alone or in conjunction with glass fibers as in the so-called "belted-bias" construction of tires.

As already pointed out above, the nature of the rubber which is bound to the fibrous material, is not critical and may be either natural or a synthetic rubber. The application of the rubber to the reinforcing fibrous material is carried out by conventional known methods. The rubber stock applied may contain additives such as for instance vulcanizers, fillers, antioxidants and pigments.

What is claimed is:
1. A composition comprising an aqueous dispersion of
    A. 50–95 parts of a resorcinol-formaldehyde-latex adhesive composition,
    B. 5–50 parts of an aqueous dispersion of the reaction product of
        1. a composition derived by reacting a triallyl cyanurate composition having 0.058 to 3.0 ringbound chlorine, with 6–10 moles of resorcinol per mole of cyanurate; and
        2. 0.2 to 0.6 mole of formaldehyde per mole of resorcinol in (1).
2. The composition according to claim 1 wherein the ringbound chlorine content is provided by at least one compound of formula:

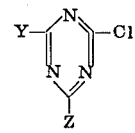

wherein Y and Z are individually a chlorine, allyloxy or hydroxy group.

3. The composition according to claim 1 wherein the ringbound chlorine content in B is about 1.0 percent.
4. The composition according to claim 1 wherein the latex in the resorcinol-formaldehyde-latex adhesive composition is a mixture of a polyvinylpyridine-styrenbutadiene terpolymer latex and a styrene-butadiene copolymer latex.

* * * * *

UNITED STATES PATENT OFFICE
CERTIFICATE OF CORRECTION

Patent No. 3,644,256     Dated February 22, 1972

Inventor(s) RAYMOND BROISMAN

It is certified that error appears in the above-identified patent and that said Letters Patent are hereby corrected as shown below:

Column 1, line 22, delete "625,487" and substitute -- 652,487 --.

Column 1, line 27, delete "la-tex" and substitute -- latex --.

Column 1, line 70, delete "3.05" and substitute -- 3.0 --.

Column 2, line 4, delete "3.08" and substitute -- 3.0% --.

Column 2, line 64, after the word "percent" add the following -- . For the purpose of obtaining TAC with between 0.05 and 3.0% --.

Column 2, line 74, delete "20°14 30°C." and substitute -- 20°-30°C. --.

Column 3, line 5, after the word "reaction" add the following -- and then adjust with 50% NaOH at the end of the reaction --.

Column 3, line 7, after the word "chlorine" insert -- . -- .

Column 3, line 50, after the word "film" insert -- . -- .

Column 4, line 38, after the number "50" insert -- % -

Column 4, line 62, delete "(5)" and substitute -- (%) -- .

Column 5, line 61, delete "70° ± 50°F." and substitute -- 70° ± 5°F. -- .

Column 5, line 63, delete "0.1,1 and 2.2 percent ringbound" and substitute -- 0.01%, 1% and 2.2% ring-bound --.

Column 6, line 11, after the word "ring-bound" insert the word -- chlorine -- .

Column 8, line 4, delete "0.058 to 3.0" and substitute -- 0.5% to 3.0% -- .

Signed and sealed this 25th day of July 1972.

(SEAL)
Attest:

EDWARD M. FLETCHER, JR.
Attesting Officer

ROBERT GOTTSCHALK
Commissioner of Patents